United States Patent [19]

Brandon et al.

[11] Patent Number: 5,043,069

[45] Date of Patent: Aug. 27, 1991

[54] FILTRATION DEVICE HAVING HARDENED GUM FORMED-IN-PLACE MEMBRANES

[75] Inventors: Steven C. Brandon, Santa Clara, Calif.; Harold G. Spencer, Clemson, S.C.

[73] Assignee: E. I. Du Pont de Nemours and Company, Wilmington, Del.

[21] Appl. No.: 423,260

[22] Filed: Oct. 18, 1989

[51] Int. Cl.$^5$ .............................. B32B 27/00; B01D 13/00
[52] U.S. Cl. ........................ 210/500.025; 210/500.28; 210/500.29; 210/500.41; 427/244; 427/245; 427/247; 264/129; 264/299
[58] Field of Search ............... 210/500.25, 500.28, 210/500.29, 500.41, 653; 427/244, 245, 247; 264/129, 299

[56] References Cited

U.S. PATENT DOCUMENTS

| | | | |
|---|---|---|---|
| 3,349,079 | 10/1967 | Freedman | 264/219 |
| 3,455,701 | 7/1969 | Miller et al. | 99/131 |
| 3,565,259 | 2/1971 | Meyer-Berge | 210/500.25 |
| 3,577,339 | 5/1971 | Baird | 210/653 |
| 4,012,324 | 3/1977 | Gregor | 210/500.28 |
| 4,249,000 | 2/1981 | Batzer | 210/500.29 |
| 4,839,203 | 6/1989 | Davis | 210/500.41 |
| 4,851,120 | 7/1989 | Reineke | 210/500.25 |

OTHER PUBLICATIONS

Kelco Div. of Merck & Co., Inc. Publication Entitled "Alginate Products for Scientific Water Control", Third Edition.

Advanced Filtration of Pulp Mill Wastes by John T. McKinnon of Int'l. Paper Co., pp. 35 and 36 and (and title page).

Primary Examiner—Jay H. Woo
Assistant Examiner—Jeremiah F. Durkin, II
Attorney, Agent, or Firm—Charles E. Krukiel

[57] ABSTRACT

Stable formed-in-place saccharinic gum membranes on a porous support, the membranes being modified by contact with at least an equivalent of multivalent cations to anionic groups in the gum.

17 Claims, No Drawings

FILTRATION DEVICE HAVING HARDENED GUM FORMED-IN-PLACE MEMBRANES

FIELD OF INVENTION

The present invention relates to stable formed-in-place saccharinic gum membranes on a porous support, the membranes being modified by contact with multivalent metal cations.

BACKGROUND

Formed-in-place membranes have many attractive features in separations by filtration, whether the application is microfiltration (of particulates), ultrafiltration, or hyperfiltration (reverse osmosis). The variety of materials from which they can be formed allows wide options in meeting severe requirements posed by temperature and aggressive chemical nature of feeds. An important characteristic is that when performance of the membranes deteriorates from fouling or other causes, they can be stripped and replaced in situ.

For certain uses, present formed-in-place membranes have limitations, as membranes based on hydrous Zr(IV) oxide illustrate. The removal and replacement of these membranes requires several hours. This is of no concern if membrane performance is satisfactory over weeks, but in cases where replacement at intervals of a day or a few days is necessary, more rapid regeneration is highly desirable, if not essential.

In food and biotechnology applications, it is further frequently desirable that the membrane material be recognized as nontoxic, and preferably on the list of substances generally recognized as safe (GRAS) or cleared for food use by the Food and Drug Administration. In this way, possible contamination of product by membrane material becomes of no concern.

A class of membrane-forming additives of interest in this context comprises saccharinic gums such as alginates, xanthates, pectins, carrageenans, guar, carboxymethyl cellulose, and scleroglucans. Many commercially available forms of these have been cleared for food use. In general, they would be expected to readily form membranes having good ultrafiltration properties, and, in some cases, membranes able to filter dissolved salt to a considerable extent. Examples with alginates and xanthates can be found in a U.S. Environmental Protection Agency report: J. T. McKinnon, EPA-600/2-79-209 (1979).

U.S. Pat. No. 4,851,120 teaches use of polysaccharides and their derivatives as composite membranes, but not as formed-in-place membranes, for separation of water from organics. It teaches use of polyvalent cationic materials to render the membrane less water soluble.

These gum membranes can be easily stripped by exposure to clean-in-place (CIP) solutions, such as hypochlorite or alkaline peroxide, typically used for cleaning and disinfecting at daily intervals in food-processing systems. They can generally be formed in less than thirty minutes, only a small increment to normal cleaning time.

Being GRAS listed and having the attributes described above, the gum formed-in-place membranes would appear to be promising candidates for applications such as pressing or clarifying juices with an "Ultrapress", such as taught in U.S. Pat. No. 4,716,044, as well as for many other food processes. But, in our evaluations of gum formed-in-place membranes, some difficulties have become apparent.

In membranes formed at low pressure [pressures up to about 50 pounds per square inch gauge (psig)], separation performance is erratic since it depends on factors other than pore size of the membrane and the size of material being separated. For example, rejection of bovine serum albumin (BSA) by a sodium alginate membrane formed in place on sintered stainless steel tubes with filter aids present having a pore size of about 0.05 to 0.15 micrometers was found to be dependent on pH and excess salt concentration. At a pH near the isoelectric point of BSA or when charges were shielded by the addition of excess salt, large species (MW about 69,000), which are removed when not near the isoelectric point and in the absence of excess salt, permeated the membrane. Separations achieved with sodium alginate membranes formed at low pressure therefore appear to be largely dependent on coulombic effects.

By forming the membrane at high pressure (greater than 50 psig, preferably greater than 150 psig) such as taught in the previously cited McKinnon report, better separation based on size considerations results. But these membranes tend to be unstable, particularly at elevated temperatures (greater than about 45° C.) that may be desired for various reasons such as increasing flux or operating under Pasteurization conditions. By unstable, it is meant that the gum membranes are too quickly stripped from the substrate by process material to be economically and practically attractive. Even at ambient temperatures, unstable gums have been found to be displaced from formed-in-place membranes when contacted with feeds containing coarse particles. Thus, they are particularly unattractive in applications in which longer membrane lifetimes are desirable.

SUMMARY OF INVENTION

We have found a method of modifying the properties of gum membranes to provide more stable membranes that have greater separating capabilities based on size considerations at a given formation pressure and that can be formed under a broader range of conditions.

The gums of this invention are gums that naturally carry anionic groups, such as carboxylates or sulfates, attached to the polymer or that are chemically modified to carry such negatively charged groups. The process comprises contacting membranes after formation with multivalent cations or, preferably, forming the membranes in the presence of the multivalent cations. The cations Ca(II) and Mg(II) are preferred because of low cost and low toxicity. A sequestering agent such as citric acid preferably is added to the formation solution containing gum and multivalent cations.

DETAILED DESCRIPTION OF INVENTION

The formed-in-place membranes of this invention are continuous films formed by exposing saccharinic gums having negatively charged ionizable groups to a solution containing multivalent cations, the equivalents of cations in the contacting solution being at least equivalent (and preferably at least 0.001 molar in excess, more preferably at least 0.0025 molar in excess) to the moles of ionizable groups present in the gums. Preferably, the gums and multivalent cations are brought into intimate contact in the forming solution prior to forming the membrane particularly if the pore size of the substrate is larger than about 0.05 micrometers.

The preferred saccharinic gums are selected from the group consisting of alginates, xanthates, pectins, carrageenans, guar modified to have anionic groups, carboxymethyl cellulose, and scleroglucans. Preferably, the gums are those of the smallest equivalent weight, that is, those with the most anionic ionizable groups per unit mass. The most preferred gums are alginates.

Multivalent cation species can be any known species that under conditions of contact contribute multivalent cations, that is, cations with a charge of at least 2+. Preferred multivalent cationic species contribute Ca(II) and Mg(II), particularly in food applications where it is desirable for materials to be GRAS-listed. Preferably, the counter ion in the species will also be acceptable in food applications. Accordingly, calcium carbonate is a preferred compound for introducing Ca(II) species.

The porous support may be any support known in the art for supporting a formed-in-place membrane. Preferably, it is porous metal support which will not be corroded by the fluids with which it is intended to be used and which can be cleaned without damage by CIP solutions. Austinitic stainless steels, particularly those of the 300 series, more particularly 316L are preferred. These supports typically are formed from non-spherical, irregularly-shaped particles having a size of about 30 to 100 micrometers. The pore size ranges from about 0.5 to 10, preferably 0.5 to 5, micrometers and the porosity of the support is about 5 to 20 percent.

The support most preferably is the stainless steel support described above altered as taught in U.S. Pat. No. 4,888,114 which is incorporated herein by reference. This preferred support (altered substrate) is a porous metal substrate formed of particles having a diameter of from 30 to 100 micrometers and a pore size of from 0.5 to 10 micrometers, the pores of which on one side of the substrate are filled to a depth of 30 to 100 micrometers with sintered metal oxide powder having a diameter of 0.2 to 1.0 micrometers. The preferred metal oxide powder is titanium dioxide in the rutile crystal form.

The porous substrate should have a pore size small enough to allow a continuous film to form. Preferably, the pore size should be from 0.05 to 0.5 micrometers, more preferably from 0.05 to 0.1 micrometers. Preferably, if the pores are greater than 1 micrometer in size such as in the unaltered substrate described above, a filter aid such as taught in U.S. Pat. No. 3,577,339, which is incorporated herein by reference, is added to help the formed-in-place membrane to bridge the pores in the substrate so as to form the continuous film. With the altered substrate, a filter aid is not preferred but can be used.

The membrane of this invention can be formed by first flowing through, about and in contact with the porous substrate in a manner known to one skilled in the art so as to create a continuous film saccharinic gums that naturally carry anionic groups, such as carboxylates or sulfates, attached to the polymer or that are chemically modified to carry such negatively charged groups. The resulting continuousfilm formed-in-place membrane is then contacted with the multivalent cations. To form a continuous film with the unmodified gum, the size of the pores in the porous substrate must be small enough or there must be sufficient filter aid to permit bridging of the pores and more rigorous formation conditions (for example, formation pressures high enough to cause the flux to be greater than 100 gfd) must be used.

Preferably, however, the membrane of this invention is formed by first making a solution of the gum and sufficient multivalent cation in a fluid, preferably water, and causing the solution to contact the surface of the substrate under sufficient pressure to cause a portion of the fluid to pass through the substrate. The pressure used will depend on the ultrafiltration application. Higher pressures, if used under conditions allowing formation of continuous films, favor formation of tighter membranes, that is, ones having lower permeability. Other formation parameters such as circulation velocity, amount of membrane-forming additive per unit area and its concentration, flux rate and temperature, can affect membrane properties as is known in the art.

Continuous film membranes can be formed at low pressures with the presently claimed process, even without filter aid on unaltered substrate having sizes of pores in the range 0.05 to 0.3 micrometers. Without the modification of the present invention, much higher pressures are required to produce a continuous film. Thus, greater latitude exists in the process for forming a membrane in place. Membranes formed at low pressure also have modified properties when formed in presence of Ca(II). In fact, it was observed that alginate membranes that reject BSA could not be formed at all on unaltered substrates, which have pores larger than one micron, whereas by adding Ca(II), one can form alginate membranes that will give complete rejection of BSA at pH not near the BSA isoelectric point and in the absence of added salt.

For many applications, the preferred pressure during formation of the gum membrane is low, that is about 15 to 50 psig. The water permeability of membranes formed at low pressure from alginates modified by the process of this invention is about 1 to 2 gallons per day per square foot of membrane per psig (gfd/psi) verses about 2 to 5 gfd/psi for alginate membranes not modified by the process of this invention.

While the upper limit on pressure is ultimately determined by the strength of the substrate, the preferred higher pressures will be determined by one skilled in the art based on the tightness of membrane desired. High pressure (greater than 50 psig, particularly 150 to 300 psig) will form tighter membranes and very high pressure (about 950 psig) will form still tighter membranes (0.1 to 0.2 gfd/psi) even in the case of alginates not modified by the process of this invention. The membranes modified according to this invention are generally tighter if formed under identical conditions including pressure than those not modified.

The formation solution should be thoroughly mixed and homogeneous in order to effectively form a continuous-film formed-in-place membrane. Temperature and pH can be adjusted so as to form such a homogeneous forming solution.

Higher temperatures will increase solubility. When the multivalent cations are present during formation, higher temperatures can be employed than when they are not. Preferably, the temperature of formation should be about 5° to 50° C. The pH should be sufficient to assure a homogeneous formation solution. If the pH is too low or too high, precipitation is likely or cations may be displaced. Preferably the pH should be in the range 3 to 8. The pH may be adjusted as needed by the addition of an inorganic or organic acid, preferably one that is GRAS listed such as citric acid. Citric acid apparently acts as a sequestering agent and is preferred when the gum and the multivalent cation species are mixed in a fluid prior to being used to form the membrane.

The multivalent cation should be present in an amount that provides at least an amount of cation, preferably Ca(II) or Mg(II), that is equivalent to the anion groups in the membrane. Preferably, the cations are present in an excess of this stoichiometric amount. Preferably, the excess is greater than 0.001 molar and more preferably greater than 0.0025 molar.

Sufficient saccharinic gum should be present in the formation solution to form a continuous film on the porous substrate. For altered substrates in most applications, about 0.1 to 1 mg per square centimeter is usually a favorable range. The concentration of gum in the forming solution will depend on the gum being used, but should be about 5 to 300 milligrams per liter (mg/l).

The formation solution should be circulated at a rate and for a time sufficient to produce a continuous film membrane, having the desired permeability for the application. Too high a permeability may also correspond to a poorly formed film (non-continuous), giving inadequate separation. In such cases, the target permeability may be achieved by lowering circulation velocity. One skilled in the art will be able to determine the optimum rate and time at a given pressure to properly form the membrane.

Membrane formation can be measured by observing the flux. As the membrane forms, the flux will decrease at a given pressure. Preferably, the membranes are formed by increasing the pressure in increments when the flux decreases until the pressure is high enough to form the desired tightness of membrane.

During formation of gum membranes, the ratio of circulation velocity to flux through the membrane may be used to attain desired permeability (flux per unit area per unit pressure). For example, at a pressure of 255 psig, and a circulation velocity of 13 ft/sec, the lowest flux reached in a formation by procedures similar to Example 4 was 147 gfd, corresponding to a permeability of 0.27 gfd/psi (adjusted to 37° C.). By lowering the velocity to 6 ft/sec, a flux of 67 gfd was attained at 230 psig, corresponding to a permeability of 0.12 gfd/psi, corrected to 37° C.

EXAMPLES

Example 1

Three sodium alginate membranes were formed on porous stainless steel tube substrate whose surface had been altered to have smaller pore sizes at the surface, as described in U.S. Ser. No. 07/310141 (altered substrate). The substrate consisted of four 10 foot long, 1.25 inch inside diameter (1.25"id) tubes having total surface area about 13 square feet (sq. ft.)

The feed was comprised of 88 liters of deionized (reverse osmosis permeate) water, to which:

For membrane 1, no calcium compound or citric acid was added;

For membrane 2, enough calcium carbonate was added to give a solution about 0.0025 molar (M) Ca(II) and enough citric acid was added to give 0.0055M, the final pH being about 3.6;

For membrane 3, enough calcium nitrate to give 0.0025M Ca(II) plus enough nitric acid to bring the pH to 3.5.

Also added was a dispersion of 0.65 grams of 0.3 micron particles and 0.65 grams of 0.014 micron particles. In each of the formations, enough sodium alginate was added for 1 gram per square foot of membrane surface, the feed concentration being 0.00078 equivalents per liter.

A fourth membrane was formed on a single test section in the presence of 0.0025M Mg(II), added as $(MgCO_3)_4 Mg(OH)_2 \cdot 5H_2O$; the same amount of alginate per sq. ft. of membrane surface was added, but the concentrations in the solution were slightly different: 0.00043N sodium alginate, and 0.0018M stoichiometric citric acid, the concentration necessary to give a final pH of 3.5.

The solution in each case was circulated for about 18 minutes at about 12 ft/sec. After this, an oversize sponge ball was forced through the system, and the liquid which was forced out was collected in a volume of 20 liters for the simple alginate and the Ca(II) cases, and 5 liters for the Mg(II) case.

In the case of the membrane formed without divalent ion, the solution was gray in color. With divalent ion added, the solutions were clear. Turbidities, measured by 90 degree scattering in a Brice-Phoenix light-scattering photometer were as reported in Table 1.

TABLE 1

| Membrane | Exposure | Turbidity |
|---|---|---|
| 1 | No divalent | 0.217 |
| 2 | Ca(II), citric | 0.023 |
| 3 | Ca(II), no citric | 0.005 |
| 4 | Mg(II), citric | 0.027 |

The membrane formed without divalent ions clearly was displaced from the tubes to a much greater extent than those prepared in presence of Ca(II) or Mg(II).

Another sodium alginate membrane formed in a similar fashion was subsequently exposed to a solution of 0.0025M Ca(II) in citric acid, pH 3.5. The turbidity of the solution forced out by the sponge ball was 0.105. Post exposure to divalent ions increased stability, but not to the extent that formation in presence of the ions did.

Example 2

Alginate membranes were formed at 25 psig on ⅝"i.d. altered-substrate porous stainless steel tubes (pore size about 0.05 micrometers) at a temperature of 30° C., circulation velocity of 6 ft/sec, from a solution containing 0.00065M sodium alginate. In one case, calcium nitrate was added to bring Ca(II) concentration to 0.004M. In the other Ca(II) was not added. The two membranes were then tested for rejection of bovine serum albumin (BSA) as a function of circulation velocity at a pH of 8 with and without added salt. Results are reported in Table 2.

TABLE 2

| Circulation Velocity meters/second | Added KCl moles/liter | Rejection Ca(II) exposure None | Rejection Ca(II) exposure exposed |
|---|---|---|---|
| 0.4 | 0 | 0.4 | 0.98 |
| 0.8 | 0 | 0.95 | 0.98 |
| 1.0 | 0 | 0.98 | 0.95 |
| 0.2 | 0.01 | 0.40 | 0.80 |
| 0.8 | 0.01 | 0.40 | 0.95 |
| 1.0 | 0.01 | 0.45 | 0.95 |

This example shows that an alginate membrane formed at low pressure passed substantial amounts of a high-molecular-weight species from some solution compositions and that exposure to a divalent cation converted it into a much more efficient ultrafiltration membrane over these conditions. It appears that without Ca(II), the pores at the support-feed interface were only coated with alginate, so that the rejection mechanism was primarily by ion-exclusion, typical of ion-exchange membranes. With Ca(II), gum is formed into a continuous film. At zero added salt, the effective charge on the BSA is much higher, and the rejections by the non-exposed membrane varied much more with circulation velocity and the corresponding concentration polarization than in presence of salt. These differences confirm that the rejection by the non-exposed membrane is largely from coulombic effects, whereas that by the exposed membrane is primarily from steric effects.

Example 3

A series of alginate membranes, stabilized by divalent ions, was compared by the changes in water permeability at about 55° observed in cycling to 80° C. and back to 55° C. The membrane supports were the insides of 1.25"id porous stainless steel tubes having 3.25 sq. ft. membrane area. The feed solution, approximately 200 liters of deionized water, was first brought to pH 3.5 by addition of citric acid. Calcium carbonate and magnesium carbonate were then added, and weighed additions of citric acid needed to bring the pH back to 3.5 were made. In all cases, the ratio of moles citric acid to moles divalent (Ca(II) plus Mg(II)) was about 3 to 3.5. Per square foot of membrane, about 5 mg of a filter aid with a particle size of about 0.3 micrometers and about 5 mg of a filter aid with a particle size of about 0.014 micrometers were added. Enough sodium alginate solution for 100 milligrams per square foot (mg/sq. ft.) was then added; the feed concentration was about 0.0000085 equivalents of carboxylate/liter. The pressure of the circulating membrane-forming solution was then raised in steps as flux decreased to about 300 psig, the temperature being about 50° C.

Membranes were formed with the same Mg(II) concentration (about 0.001M) but different Ca(II) concentrations. The test sections were connected in series and a temperature scan of permeation rate of water from ambient temperature to 80° C. and back to 50° C. was carried out. The results as a function of divalent ion concentration are summarized in Table 3 Comparison is in terms of permeability (gfd/psi) measured at about 55° C. and adjusted to 37° C. by known dependence of water permeability on temperature, measured in ascending and descending temperature. Pressures were about 200 psig. A membrane formed with no divalent cation to a somewhat different permeability by a somewhat different procedure is included for comparison of hysteresis.

TABLE 3

| Cation (moles/liter) | | Total moles M(II)/ equiv alginate | Permeability (gfd/psi) | |
| --- | --- | --- | --- | --- |
| Ca(II) | Mg(II) | | Ascending Temp. | Descending Temp. |
| 0 | 0 | 0 | 0.46 | 0.65 |
| 0.0003 | 0.001 | 164 | 0.94 | 1.35 |
| 0.0006 | 0.001 | 200 | 0.86 | 1.00 |
| 0.0024 | 0.001 | 411 | 0.86 | 0.94 |

The increase in permeability after cycle to higher temperature indicates instability of the membrane. It can be seen that exposure to divalent ions decreases this instability.

Example 4

This example shows the effect of Ca(II) concentration on the permeability of an alginate membrane for water, measured just after formation, at about 40° C. The membranes were formed by the general procedures used in Example 1 and in the preceding example, at about 200 psig; conditions were matched as closely as feasible—formation times 17 to 21 minutes and maximum temperature during formation between 52° and 60° C. Except as noted in Table 4, calcium was added as calcium carbonate, and the citric acid effected its dissolution and adjustment of pH.

TABLE 4

| Ca(II) Molar | Sodium Alginate equiv/l | Citric acid Molar | pH | Permeability, gfd/psig (37° C.) |
| --- | --- | --- | --- | --- |
| 0 | 0.00015 | 0.00075 | 3.5 | 2.01 |
| 0 | 0.00078 | 0.00074 | 3.5 | 0.97 |
| 0.0013 | 0.00078 | 0.0028 | 3.5 | 0.79 |
| 0.0026 | 0.00015 | 0.0055 | 3.5 | 0.72 |
| 0.0026 | 0.00078 | 0.0066 | 3.5 | 0.65 |
| 0.0026* | 0.00078 | 0 | 3.5 | 0.54 |
| 0.0026* | 0.00078 | 0 | 6.6 | 0.38 |
| 0.0079 | 0.00078 | 0.0165 | 3.5 | 0.15 |

*Ca(II) added as nitrate, and pH adjusted with nitric acid.

It can be seen that by increasing calcium, the permeability of the membrane decreases. Although fluxes measured after temperature scans tended also to follow a declining trend with increasing Ca(II), there was more hysteresis than in the preceding example. Presumably this was because the ratio of divalent cation to equivalents of alginate is much less in this example than in that using low concentrations of alginate—0 to 17.3 here, compared to 0 to 400 at the low alginate. The conditions used here have proved advantageous in producing pineapple juice from hulls by the "Ultrapress" process.

A membrane formed in a similar manner in presence of 0.0026M Mg(II) (0.00043N alginate, 0.0053M citric acid, pH 3.5) had a permeability of about 1.4.

Example 5

A membrane was formed on altered-substrate porous stainless-steel tubes in a test unit comprised of four 1.25"i.d. tubes. To 265 liters of filtered water, 14.8 kg of citric acid was added, pH then being 2.5. Calcium carbonate was then added to 0.0025M Ca(II). Sodium alginate, 0.1 g/sq ft, plus enough filter aid for 0.01 g/sq ft total were blended into an aqueous suspension and then added. The feed was circulated at about 40° C. until at 300 psig, a permeability of 1.87 gfd/psig was attained (1.66 adjusted to 37° C.). The formation solution was drained, and permeability measured with water was 1.52 gfd/psi adjusted to 37° C.

Cloudy, depectinized apple juice, the fluid normally processed by diatomaceous earth filtration, was then introduced. In a pressure scan, a flux of 280 gfd was attained at 244 psig. In subsequent runs at 200 psig, fluxes usually fell between 220 and 300 gfd. Permeate was clear, typically about 0.5 NTU and sugar passages exceeded 98%.

In this application, high fluxes were required, and a low amount of sodium alginate per square foot was used. Similar results were obtained in clarification of pear juice.

Example 6

""""Ultrapress"""" signifies both pressing juice from the fruit and clarifying at the same time. In this case, the feed material was pineapple hulls, from which it was desired to extract juice for canning of pineapples. The test unit was comprised of 480 ft of approximately 3"i.d. porous stainless steel tubes, there being about 360 sq ft of membrane surface. The membranes were formed from about 1900 liters of water, to which 2500 grams of citric acid had been added, and calcium carbonate to a pH of 3.5. A gram of sodium alginate/sq ft was added, along with the filter aid used in the other examples; here a lower initial permeability was desired. In test runs of 8 to 15 hours, carried out over more than a month, fluxes ranged from 20 to 40 gfd, in operation with inlet pressure of about 600 psig and outlet pressure varying from 100 to 300 psig. The products were clear, and recovery of permeate was about 60-75% of feed on a volume basis. Sugar passages exceeded 80%. Operating temperatures were mostly between 55° and 75° C. In this case, both altered substrates and conventional tubes were incorporated. In general, initial performance was similar, but altered substrates were easier to clean, and therefore gave more consistent performance.

Example 7

An alginate membrane was formed by the procedure similar to Membrane 2 of Example 1. The support was a module of four ⅜"id porous stainless-steel tubes in parallel, total membrane area being 6.3 sq ft. Its performance with white water from a pulp and paper plant was compared with that of a baretube module, connected in series, over a pressure scan from about 30 to 220 psig and back to 115. Although the permeability at the initial pressure of the bare tube was 35% greater than that of the membraned tube, by the second point (70 psig), the permeability through the membraned tube was 25% higher. On return to 115 psi, the flux through the membraned tube was 250 gfd, in comparison to 103 through the bare tube. Feed circulation velocity in this test was 15 ft/sec, and the temperature of the process stream was about 50° C. Separations of both test sections were good, there being essentially no suspended solids in the permeate. This test covered two hours operation.

The membrane was stripped, replaced, and tested with white water over eight days. Pressures over the period varied between about 60 and 110 psig, and fluxes from about 200 gfd at the start to 90 gfd at the termination.

We claim:

1. A process for forming an ultrafiltration device comprising a formed-in-place membrane on a porous substrate, the process comprising flowing through, about and in contact with the porous substrate a solution of a saccharinic gum having anion ionizable groups in a fluid and contacting said saccharinic gum with a sufficient amount of a multivalent cationic species, said amount of cationic species being sufficient to provide at conditions of contact at least an equivalent of multivalent cations to the ionizable groups in the gum, said gum being present in a sufficient amount to form a continuous film on one side of the substrate, and said substrate having sufficiently small pores to allow formation of a continuous film, at a pressure of at least 15 psig.

2. The process of claim 1 wherein the cationic species is added to the fluid before it flows through, about and in contact with the porous substrate.

3. The process of claim 2 wherein there is at least a 0.001 molar excess of cations over the stoichiometric equivalent of anionic groups in the gum.

4. The process of claim 3 wherein there is at least a 0.0025 excess.

5. The process of claim 2 wherein the saccharinic gum is selected from the group consisting of alginates, xanthates, pectins, carrageenans, carboxymethyl cellulose, guar modified to have anionic groups, and scleroglucans.

6. The process of claim 5 wherein the saccharinic gum is alginate.

7. The process of claim 6 wherein the multivalent metal cations are Ca(II) or Mg(II).

8. The process of claim 7 wherein the pressure is about 15 psig to 50 psig.

9. The process of claim 7 wherein the pressure is greater than 150 psig.

10. The process of claim 7 wherein an acid is added to adjust the pH to about 3.5 to 6.5.

11. The process of claim 10 wherein the acid is citric acid.

12. An improved filtration device comprising a porous substrate, having a pore size sufficiently small to allow support of a continuous film and a formed-in-place membrane thereon, said membrane comprising a saccharinic gum having negatively charged ionizable groups, the improvement being the presence of multivalent cations in the formed-in-place membrane, the equivalents of such cations being at least equivalent to the moles of ionizable groups present in the gums.

13. The device of claim 12, wherein the saccharinic gum is selected from the group consisting of alginates, xanthates, pectins, carrageenans, carboxymethyl cellulose, guar modified to have anionic groups, and scleroglucans.

14. The device of claim 13 wherein the multivalent cations are Ca(II) or Mg(II).

15. The device of claim 13 in which the support is porous stainless steel.

16. The device of claim 15, in which the requisite pore size of the substrate is attained by the addition of fine particulates in the membrane formation.

17. The device of claim 15 wherein the support comprises a porous stainless steel substrate formed from particles having a diameter of from 30 to 100 micrometers and a pore size of from 0.5 to 10 micrometers, the pore of which on one side of the substrate being filled to a depth of 30 to 100 micrometers with sintered metal oxide powder having a diameter of from 0.2 to 1.0 micrometers.

* * * * *